United States Patent

Childers et al.

[11] Patent Number: 5,218,585
[45] Date of Patent: Jun. 8, 1993

[54] PHASE SHIFTING FEEDBACK CONTROL IN AN OPTICAL DISK DRIVE

[75] Inventors: Edwin R. Childers, Tucson, Ariz.; Tetsuya Kokubo, Kanagawa, Japan; David P. McReynolds, Tucson, Ariz.; Koichiro Nanke, Fujisawa, Japan

[73] Assignee: International Business Machines, Corporation, Armonk, N.Y.

[21] Appl. No.: 591,157

[22] Filed: Oct. 1, 1990

[51] Int. Cl.$^5$ .............................................. G11B 7/00
[52] U.S. Cl. .................................... 369/44.14; 369/44.32
[58] Field of Search ............ 369/44.11, 44.14–44.22, 369/32, 112, 115, 219, 215, 247, 263, 264, 249, 269, 44.32, 75.1, 75.2; 360/106, 97.02; 359/813, 814, 819, 822, 823, 824

[56] References Cited

U.S. PATENT DOCUMENTS

| | | | |
|---|---|---|---|
| 4,554,653 | 11/1985 | Malissin et al. | 369/45 |
| 4,646,283 | 2/1987 | Ito et al. | 369/256 |
| 4,669,823 | 6/1987 | Iguma et al. | 380/255 |
| 4,691,311 | 9/1987 | Jansen et al. | 369/100 |
| 4,694,442 | 9/1987 | Gijzen et al. | 369/44.32 |
| 4,696,566 | 9/1987 | Sekimoto et al. | 350/255 |
| 4,818,069 | 4/1989 | Maan | 350/321 |
| 4,840,457 | 6/1989 | Remer | 369/44.15 |
| 4,947,481 | 8/1990 | Ikedo et al. | 369/249 |
| 5,063,548 | 11/1991 | Yamashita et al. | 369/32 |

FOREIGN PATENT DOCUMENTS

| | | | |
|---|---|---|---|
| 0150137 | 7/1986 | Japan | 369/44.15 |
| 0231433 | 10/1987 | Japan | 369/44.15 |

*Primary Examiner*—Aristotelis Psitos
*Assistant Examiner*—Thang V. Tran
*Attorney, Agent, or Firm*—M. W. Schecter

[57] ABSTRACT

The invention is an optical disk drive which controls mechanical feedback to a focus servo actuator by shifting the phase of the feedback along its path back to the servo an additional 180 degrees to eliminate the degradation of the phase margin and prevent servo instability. The phase shift may be induced at any practical location along the feedback path. The phase shift is preferably induced by creating a slit or opening in the base of the optical disk drive. The opening must be positioned properly, shaped appropriately, and large enough to create a new base resonant frequency which prevents the opposite sides thereof from vibrating in phase. Alternatively, the phase shift may be induced by altering other components in the feedback path. For example, the phase shift can be induced by modifying the spindle motor assembly to create a new spindle resonant frequency.

4 Claims, 4 Drawing Sheets

TO FIG. 1A

PHASE SHIFTING FEEDBACK CONTROL IN AN OPTICAL DISK DRIVE

BACKGROUND OF THE INVENTION

1. Field of the Invention

The present invention relates to the control of feedback in a servo control system. More particularly, the invention relates to the control of mechanical feedback from vibration in an optical disk drive to prevent destabilization of a servo control system in the optical disk drive.

2. Discussion of the Related Art

Modern computers include high performance main memory used to store user data and the instructions for processing the user data. Main memory is generally in the form of solid state microchips which operate at rapid, purely electronic speeds. Because main memory is also very expensive, it is usually supplemented with peripheral storage devices. Such devices include, for example, magnetic tape drives, magnetic disk drives, and optical disk drives. As used herein, the term "peripheral storage device" also includes similar devices used outside of the data processing environment, such as those used for audio and/or video recording.

Peripheral storage devices typically include one or more servo control systems (hereinafter "servos"). A servo is an automatic control system in which an output is constantly or intermittently compared with an input so that the error or difference therebetween can be used to bring about the desired operation. In peripheral storage devices, the output is typically an operating characteristic and is used to adjust the operation of the device directly relating thereto. For example, in magnetic disk drives, a tracking servo may be used to control the amount of physical misalignment, if any, between a data track on the magnetic disk and the read/write elements of the magnetic disk head. The misalignment may be caused by radial runout of the tracks on the disk, which is one or more radial imperfections resulting from manufacturing tolerances or the operating characteristics relating thereto. As the misalignment is monitored, the relative position of the disk to the head is continually adjusted/corrected to allow for the proper reading/writing of data to a desired track. In optical disk drives, a focus servo is also used to accommodate the axial runout (similar to radial imperfections, but axial in nature, such as variations in disk thickness) of a disk. This servo monitors the distance between an optical disk and the objective lens of the optical disk drive. The objective lens has a fixed focal length; the focus servo is used to adjust the relative position of the objective lens to the disk to maintain the light beam of the optical disk drive in proper focus upon the active recording layer of the disk. Techniques for monitoring track misalignment and the distance between an optical disk and an objective lens are well known.

Many servos are used to control mechanical actions, as in the previously-described servo examples. Using the focus servo of an optical disk drive as a further example, the mechanical action is the activation of a voice coil motor or other actuator to move the objective lens closer to or farther from the surface of the optical disk. When no feedback is present, there is no particular phase or amplitude relationship between the vibration of the optical disk and the electrical input to the actuator. However, depending upon the specific physical configuration of a device, the mechanical action can result in certain additional, generally undesirable movement which is fed back into the servo. Again using the focus servo as an example, the action of the motor to adjust the position of the objective lens may result in vibration being passed through the actuator mounting, through the base or housing of the optical disk drive, through the spindle motor, and to the optical disk. As the optical disk vibrates, the distance between it and the objective lens varies further. Such additional vibration of the disk due to mechanical feedback, and not from axial runout, effects the operation of the servo according to certain characteristics of the feedback. The magnitude of the mechanical feedback becomes very large at the resonant frequency of the optical disk and, if the resonant frequency of the disk is close to the crossover frequency of the servo (the crossover frequency is that at which the open loop servo response crosses through zero dB magnitude), the phase margin at such crossover frequency will be degraded. If so, the amplitude of the disk motion resulting therefrom increases dramatically and destabilizes the servo loop.

Destabilizing mechanical feedback is typically controlled by separation of the feedback source or by reduction of the feedback amplitude. Feedback control by separation does not refer to physical separation (which is assumed not possible here), but to separating the resonant frequency and the crossover frequency. Again, using the focus servo example, the resonant frequency of the disk relative to the crossover frequency of the servo could be adjusted by altering the mechanical or operating characteristics of either. At one time, such changes could be made with relative ease, but heretofore unrecognized problems now exist. Because of the now common standardization of peripheral recording media, there is little room to change the resonant frequencies thereof if a device is to be commercially viable. In addition, it is not desirable to adjust the crossover frequency of an actuator lower, as such reduces the performance of the servo. Finally, in modern finely tuned actuators, it is difficult to increase the crossover frequency of an actuator without significantly increasing costs.

Feedback control by amplitude reduction is accomplished by simple stiffening of the device components in either of two ways. First, the materials used to manufacture the components may be selected for their natural mechanical properties. For example, steel may be used instead of aluminum or flexible plastics. Second, regardless of the materials used, the components can be thickened or otherwise made more massive to increase their stiffness and decrease the likelihood of their vibrating. Unfortunately, simple stiffening of the device components is also associated with several heretofore unrecognized problems. First, peripheral storage devices are already manufactured from relatively stiff materials to provide adequate sturdiness. Further materials improvements require more exotic, and expensive, materials. The use of thicker components also adds to the expense of the device by requiring more of each material used. In addition, thicker components add to the weight of the device, reducing transportability. Finally, thicker components are not possible in certain space limited environments, such as peripheral storage devices mounted internally in personal computers and workstations, or those mounted in standard size racks for use in larger data processing systems.

SUMMARY OF THE INVENTION

In view of the foregoing, the principle object of this invention is the improved control of mechanical feedback in a servo.

Another object of this invention is the control of mechanical feedback in a servo operating as a component of a peripheral storage device.

Yet another object of this invention is the control of mechanical feedback in an optical disk drive servo by means other than separation or amplitude reduction.

These and other objects of the invention are accomplished by shifting the phase of the mechanical feedback along its path back to the servo approximately 180 degrees to eliminate the degradation of the phase margin and prevent servo instability. The phase shift may be induced at any practical location along the feedback path. As implemented in an optical disk drive, the phase shift is preferably induced by creating an opening in the base of the optical disk drive. The opening must be positioned properly, shaped appropriately, and large enough to create a new base resonant frequency which prevents the opposite sides thereof from vibrating in phase. Alternatively, the phase shift may be induced by altering other components in the feedback path. For example, the phase shift can also be induced by modifying the spindle motor assembly to create a new spindle resonant frequency.

The foregoing and other objects, features and advantages of the invention will be apparent from the following more particular description of the preferred embodiment of the invention as illustrated in the accompanying drawing.

DETAILED DESCRIPTION OF THE PREFERRED EMBODIMENT

Figure 1A:
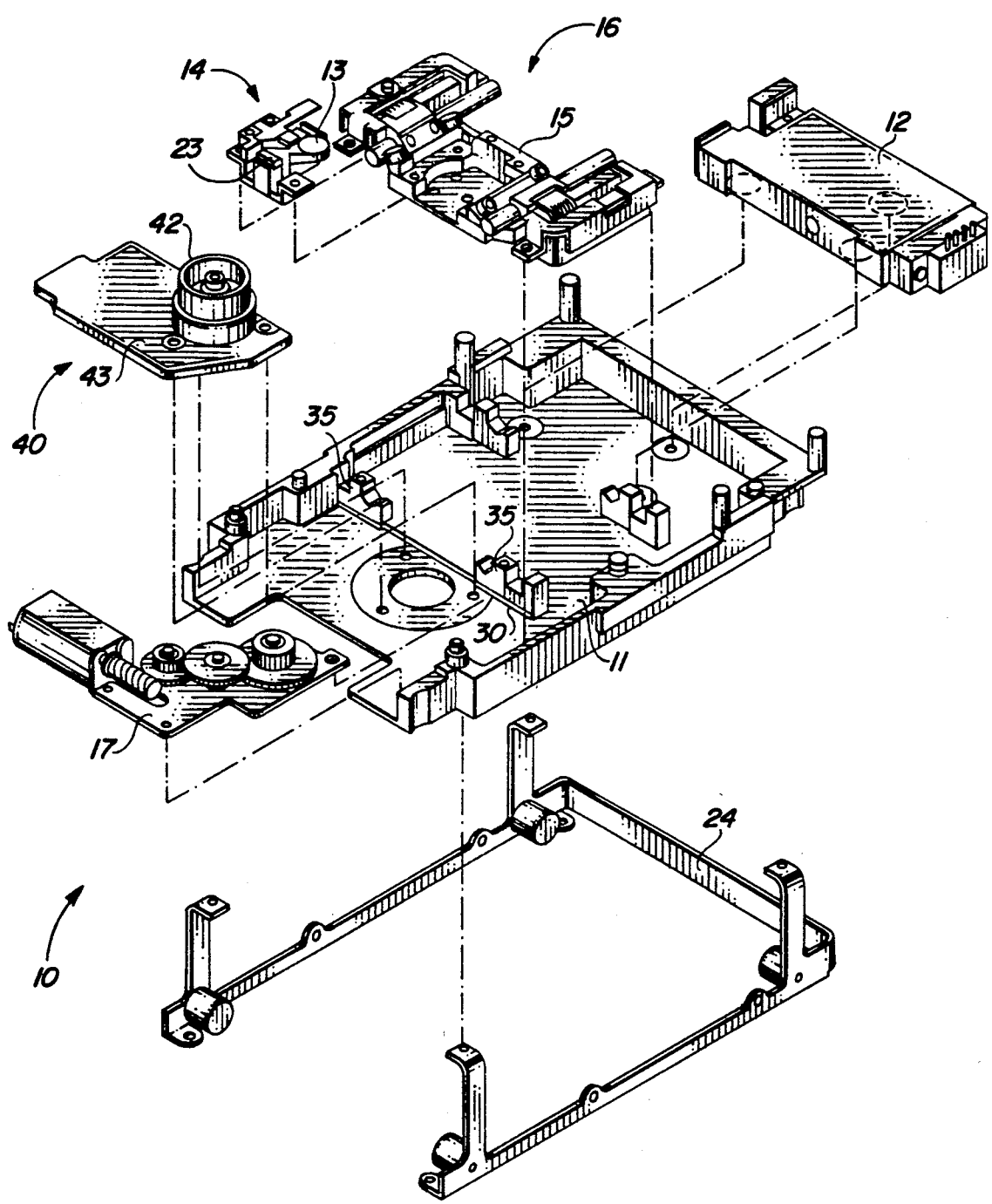
FIGS. 1a and 1b combine to form an exploded perspective view of an optical disk drive according to the invention.

Referring now more particularly to the drawing, like numerals denote like features and structural elements in the various figures. The invention will be described as practiced for a focus servo and fine actuator of an optical disk drive. It should be understood that the invention may also be practiced for other sources of mechanical feedback, and in other peripheral storage devices.

Figure 1B:
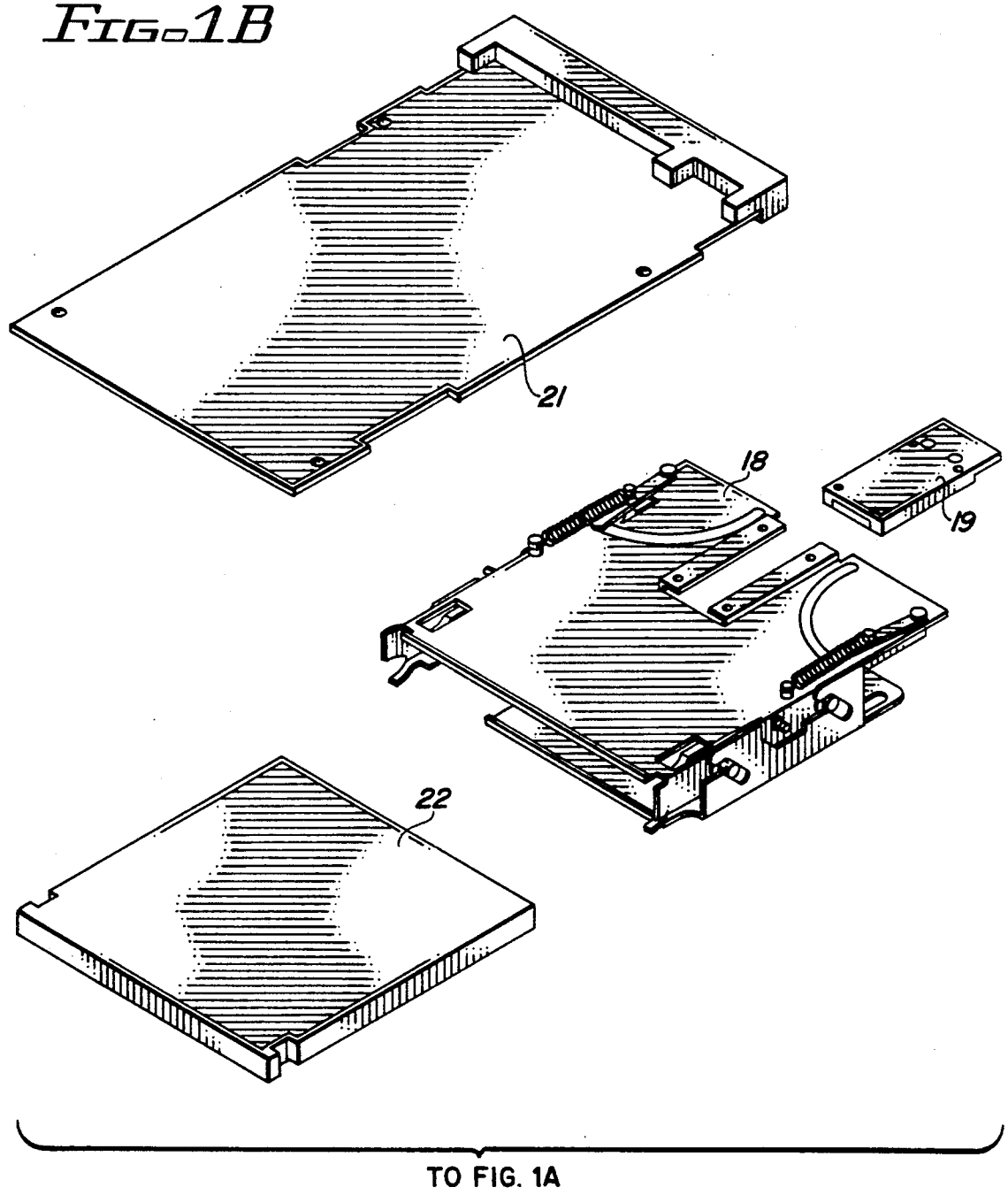

Referring to FIGS. 1a and 1b, an optical disk drive 10 according to the invention will now be described. Optical disk drive 10 includes a frame 24 in which is mounted a base 11 which is machined or cast from aluminum. Base 11 is approximately 146 mm long, 98 mm wide, 14 mm high, and 2 mm thick. An optical read/write head 12 is mounted in base 11 and includes a laser for providing the optical beam. An objective lens 13 is mounted on a fine actuator 14 which includes two voice coil motors 23. Fine actuator 14 is mounted on a carriage 15 of coarse actuator 16, which is itself on mountings 35 in base 11. Also mounted in base 11 is a load motor 17 and a spindle motor assembly 40, including a spindle mounting flange 41 (not shown in FIGS. 1a and 1b), a hub 42, and a motor driver card 43. Spindle motor assembly 40 is manufactured from and is seated in a circular opening in the bottom of base 11. A disk cartridge loader 18 is movably mounted above the aforementioned components and includes a magnetic bias coil 19. A circuit card 21 includes the circuits and microcode for operation of optical disk drive 10, such as the data channel and mechanical tracking and focussing servos. The design, operation, and connection of the circuit card 21 to the remaining components of optical disk drive 10 can be of any appropriate design, as is known. Data is stored on a 90 mm magneto-optical disk in a disk cartridge 22. The optical disk is manufactured according to proposed American National Standards Institute (ANSI) standard XB311/89-120, published for review as draft X3.192-199x and is hereby incorporated by reference. The optical disk has a resonant frequency of approximately 1.5 kilohertz. The shutter of disk cartridge 22 is not shown in the drawing, but is also known.

Upon insertion of disk cartridge 22 into loader 18, the movement of loader 18 is controlled by load motor 17 to properly seat the optical disk on hub 42 with shutter open to expose the optical disk therein. The spindle motor then rotates hub 42 and the optical disk thereon. Data is written to the optical disk by heating a spot in the active recording layer on the disk above its Curie temperature with the beam emitted by head 12. At such temperature, the magnetic bias applied by bias coil 19 is used to orient the magnetic domains of the spot in the desired direction to create a bit. Data is read from the optical disk by reflecting the beam emitted by head 12 off a spot and detecting the bit stored at the spot using the Kerr polarization effect. The optical beam is directed from head 12 through objective lens 13 by a beam bending prism or mirror included on carriage 15. Carriage 15 can be moved radially beneath the optical disk by coarse actuator 16 for coarse optical tracking of the data tracks on the disk by the optical beam. Objective lens 14 can be moved radially and vertically beneath the optical disk by voice coil motors 23 of fine actuator 14 for fine tracking and focussing of the optical beam upon the active recording layer of the disk. Head 12 includes optical components such as detectors for optically determining tracking error and focussing error signals (the focussing error is the difference between the actual and desired separation of the optical disk and objective lens). Such data accesses, tracking, focussing, and other optical disk drive operations are well known.

The focus servo of optical disk drive 10 controls the focus operations of objective lens 13. The input of the focus operation is the electrical signal which causes a voice coil motor 23 in fine actuator 14 to mechanically position objective lens 13. The output of the focus operation is the focus error signal. The focus servo continuously monitors the focus error signal and electrically signals the mechanical adjustment of objective lens 13 by fine actuator 14 to eliminate any focus error. The mechanical action of fine actuator 14 is approximately 180 degrees out of phase with the electrical input signal thereto. The focus servo has an open loop crossover frequency of slightly more than 1.5 kilohertz. The mechanical action of a voice coil motor of fine actuator 14 results in vibration which is fed on a path through coarse actuator 16 and its mountings 35, base 11, and spindle motor assembly 40 to the rotating optical disk. With no opening 30 in base 11, the mechanical feedback at a mechanical action frequency near the disk resonant frequency causes the optical disk to vibrate at a large amplitude with respect to the voice coil motor and approximately 104 degrees out of phase with the electrical input signal. Such a large amplitude and phase-shifted feedback causes degradation of the phase margin at the crossover frequency and results in servo destabilizing variations in the control of the fine actuator which increases the amplitude of disk vibration. This feedback must thus be controlled for proper operation of the focus servo.

Instead of controlling the mechanical feedback by separation or amplitude reduction and accepting the aforementioned disadvantages, the phase of the mechanical feedback is intentionally shifted an additional 180 degrees (approximately) to eliminate the degradation of the phase margin at the crossover frequency. The additional phase shifting of the mechanical feedback is created by changing the vibrational transmission characteristics of base 11 to induce an additional resonant frequency therein. The addition of an elongated slit or opening 30 machined or cast into base 11 causes the portion of base 11 on either side thereof to vibrate out of phase. So long as opening 30 is placed in the feedback path, and the opening is large enough and shaped properly to create distinct out of phase vibrations in the two portions, focus servo instability is prevented. In the preferred embodiment, opening 30 is approximately 71 mm long and 1.5 mm wide. An opening 35 mm in length was tried but did not cause the required phase shift as it was only located between mountings 35 across the width of base 11 and therefore did not intercept the feedback path through such mountings 35. Also, the circular opening used to seat spindle motor assembly 40 does not cause the required phase shift as it too is not located in the feedback path through mounting flange 41 and base 11. There is no simple technique to predict in advance whether a particular opening 30 in the feedback path will be of proper size and shape to prevent focus servo instability—the system should be built and tested to ensure the desired results. Any weakness created by opening 30 is minimized by modifying opening 30 to place the new base resonant frequency as close to but below the crossover frequency of the focus servo. In such a manner, mechanical feedback is controlled without modification of the resonant frequency of the optical disk, without additional electronics or complex mechanical structures, and without the stiffening or thickening of drive components.

Figure 2:
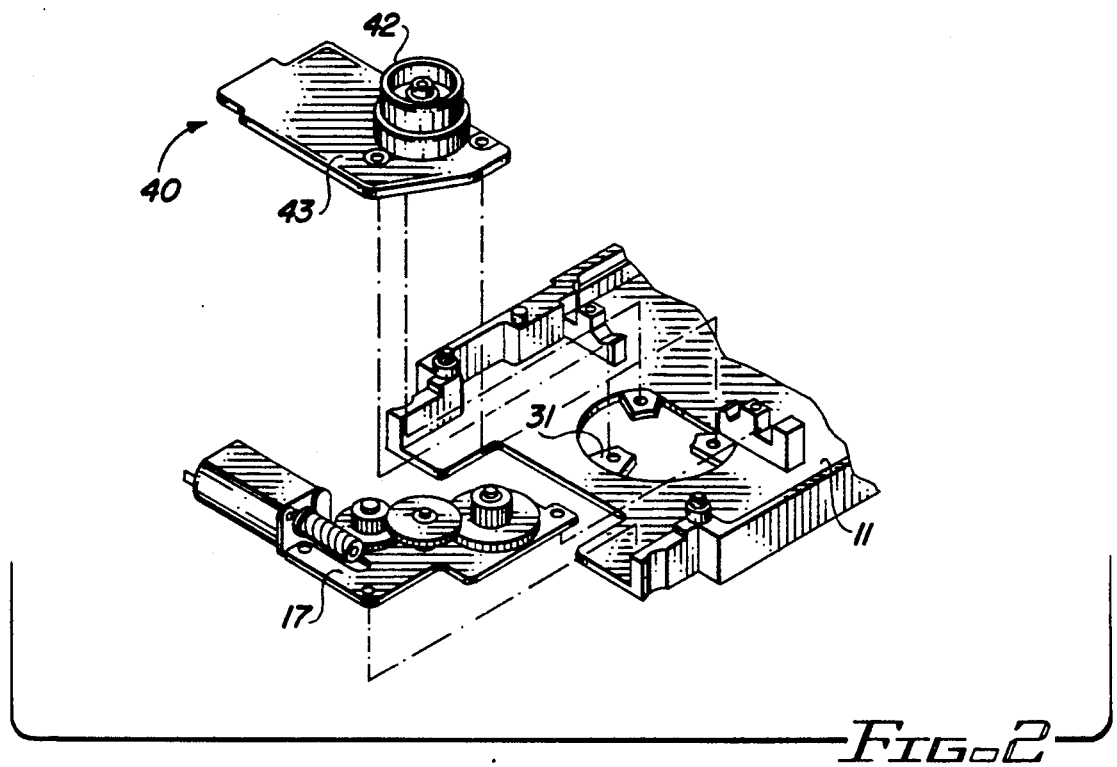
FIG. 2 is an exploded perspective view of a portion of another optical disk drive according to the invention.
Figure 3:
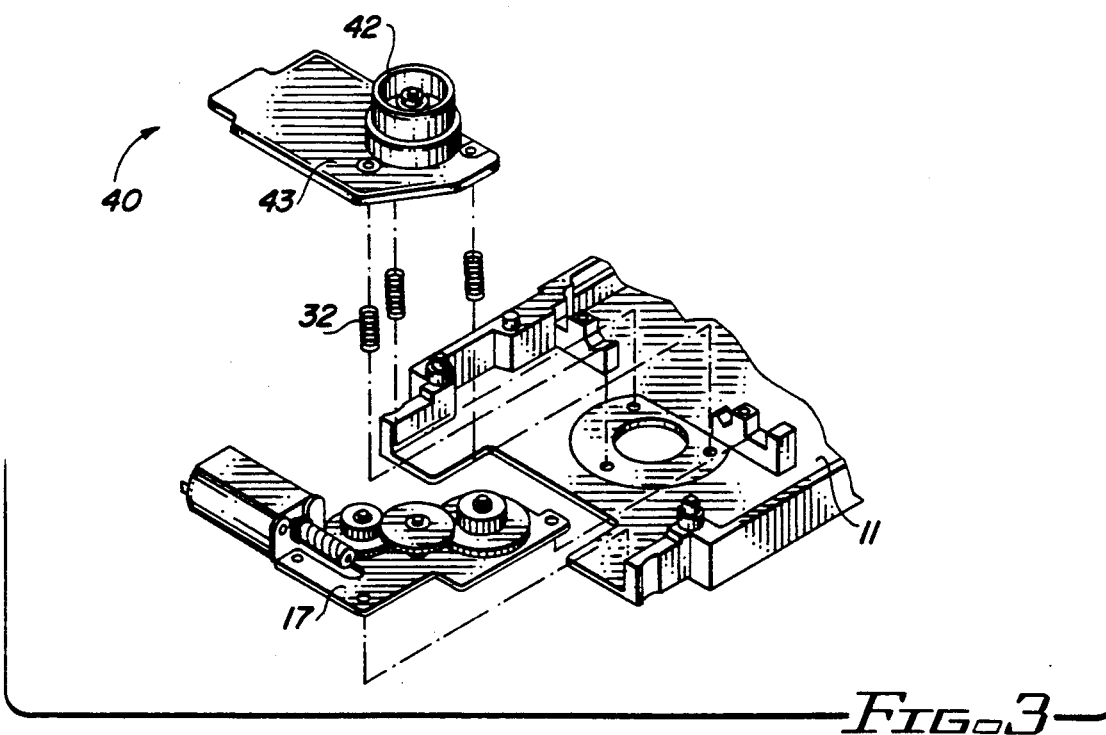
FIG. 3 is an exploded perspective view of a portion of yet another optical disk drive according to the invention.

Referring to FIG. 2, the changed portion of an alternative optical disk drive with the mechanical feedback phase-shifted an additional 180 degrees along its path back to the servo will now be described. In such alternative, base 11 is modified as shown around spindle motor assembly 40 to create mounting flexures 31 which provide the necessary transmission characteristics to the feedback path. Referring to FIG. 3, the changed portion of another such alternative optical disk drive is shown. Here, spindle motor assembly 40 is suspended on springs or rubber vibration isolators 32 to again provide the necessary transmission characteristics.

Figure 4:
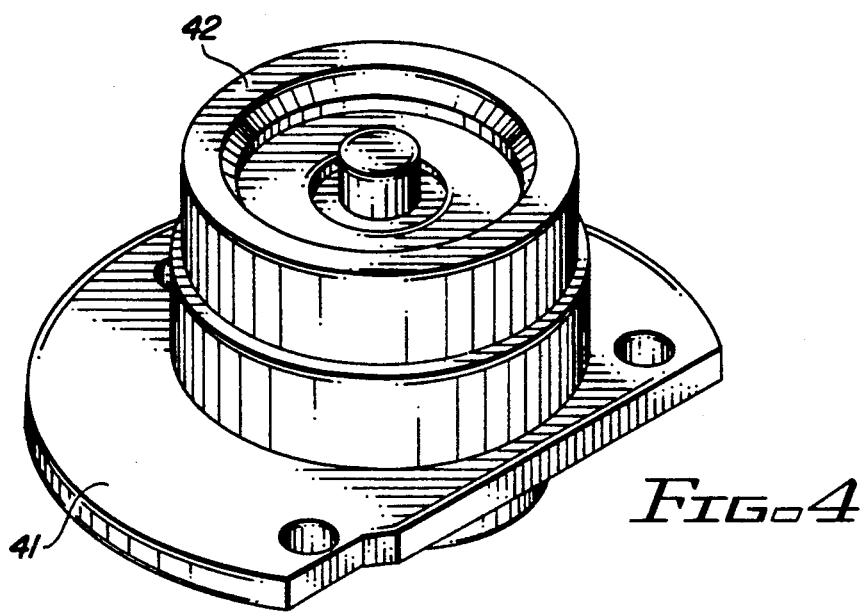
FIG. 4 is an enlarged, perspective view of the spindle motor assembly of FIGS. 1a and 1b with the motor driver card removed.
Figure 5:
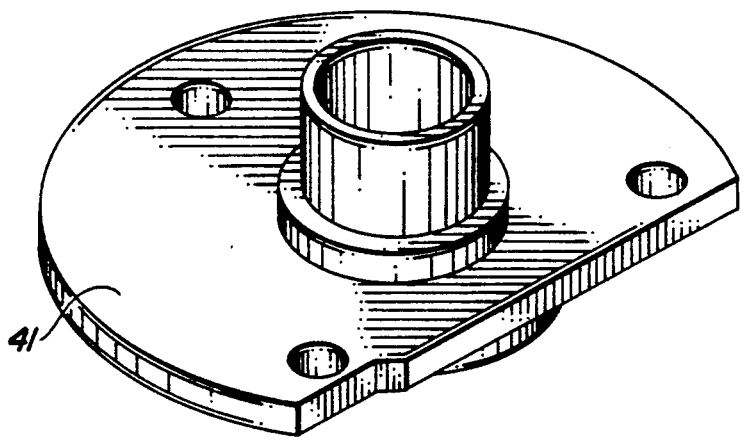
FIG. 5 is a perspective view of the spindle mounting flange of FIG. 4.
Figure 6:
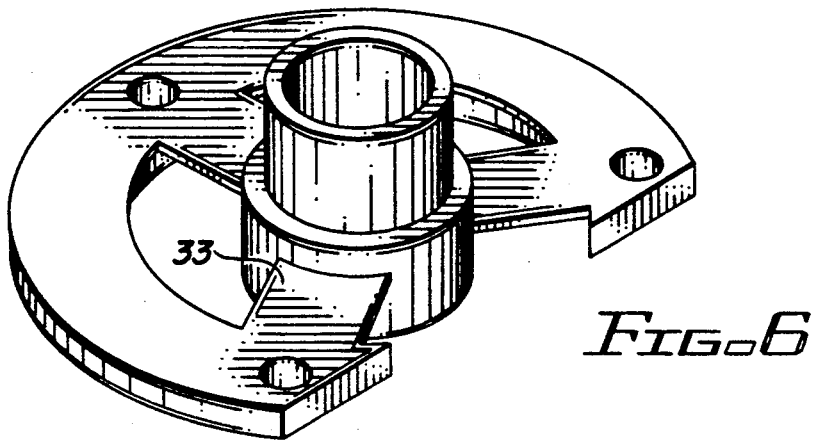
FIG. 6 is a perspective view of a spindle mounting flange according to the invention.

FIG. 4 shows the spindle motor assembly 40 with motor driver card 43 removed to further reveal mounting flange 41. FIG. 5 shows mounting flange 41 with hub 42 removed. Referring to FIG. 6, yet another alternative according to the invention is shown. Here, three flexures 33 are created in mounting flange 41 in place of opening 30 (which is eliminated) to again provide the necessary transmission characteristics. In each case mounting flange 41 may be manufactured from aluminum or other suitable materials. Note that the embodiments of FIGS. 2, 3, and 6 may be most advantageous in that the additional springs, flexures, or vibration isolators may provide feedback amplitude reduction in addition to the phase-shift. However, these modifications may also be less advantageous than simply using opening 30 as they are more complex (and hence expensive), and allow for additional "slop" among moving parts which may not be tolerable.

While the invention has been shown and described with reference to preferred embodiments thereof, it will be understood by those skilled in the art that various changes in form and detail may be made therein without departing from the spirit, scope and teaching of the invention. For example, the opening in the base is shown as a slit, but may be any opening positioned properly, shaped appropriately, and large enough to create a new base resonant frequency which prevents the opposite sides thereof from vibrating in phase. Accordingly, the invention disclosed herein is to be limited only as specified in the following claims.

What is claimed is:

1. A mechanical system comprising:
    a base;
    a first component;
    a second component mounted on the base;
    a mechanical actuator mounted on the base and coupled to the first component for adjusting a position of the first component relative to a second component in response to an electrical input indicating a desired position of the first component relative to the second component, the mechanical actuator generating vibration of a phase as vibration feedback which effects the position of the second component;
    a servo coupled to the mechanical actuator for monitoring the position of the first component relative to the second component, for generating the electrical input to the mechanical actuator and for adjusting the electrical input to the mechanical actuator as a result of such monitoring to move the first component to a desired position relative to the second component; and
    an opening in the base between the second component and the mechanical actuator for shifting the phase of the feedback along its path so as to reduce the vibration feedback which effects the position of the second component.

2. A peripheral storage device for reading from a peripheral storage medium therein comprising:
    a base;
    a motor mounted on the base and suitable for coupling a peripheral storage medium thereto;
    an internal component;
    a mechanical actuator mounted on the base and coupled to the internal component for adjusting a position of the internal component relative to the peripheral storage medium, the mechanical actuator generating vibration of a phase which effects the position of the internal component relative to the peripheral storage medium as vibration feedback in the peripheral storage medium, a servo coupled to the mechanical actuator for monitoring the position of the internal component relative to the peripheral storage medium and for activating the actuator as a result of such monitoring to move the internal component to a desired position relative to the peripheral storage medium; and an opening in the base between the motor and the mechanical actuator for shifting the phase of the feedback along its path so as to reduce the vibration feedback which effects the peripheral storage medium.

3. An optical disk drive for reading an optical disk therein comprising:
 a base;
 a motor mounted on the base,
 a spindle rotatably coupled to the motor, the spindle suitable for mounting an optical disk thereon;
 an optical beam source;
 an objective lens for focussing the optical beam on the optical disk;
 a mechanical actuator mounted on the base and coupled to the objective lens for adjusting a position of the objective lens relative to that of the optical disk, the mechanical actuator generating vibration of a phase which effects the position of the objective lens relative to that of the optical disk as vibration feedback in the optical disk;
 a servo coupled to the mechanical actuator for monitoring the position of the objective lens relative to that of the optical disk and for activating the actuator as a result of such monitoring to move the objective lens to a desired position relative to that of the optical disk; and
 an opening in the base between the motor and the mechanical actuator for shifting the phase of the feedback along its path from the mechanical actuator to the optical disk so as to reduce the vibration feedback which effects the position of the optical disk.

4. The optical disk drive of claim 3 wherein the servo is a focus servo.